United States Patent [19]

Wicks et al.

[11] Patent Number: 5,654,846
[45] Date of Patent: Aug. 5, 1997

[54] DISK DRIVE UNIT TILT DEVICE

[75] Inventors: James Edward Wicks, Tarrytown, N.Y.; Scot Robert Cochran, San Diego, Calif.

[73] Assignees: Sony Corporation, Tokyo, Japan; Sony Electronics, Inc., Park Ridge, N.J.

[21] Appl. No.: 580,316

[22] Filed: Dec. 28, 1995

[51] Int. Cl.[6] ................................. G11B 33/02
[52] U.S. Cl. .................. 360/97.01; 369/75.1; 361/685; 361/726
[58] Field of Search ............... 360/97.01, 97.02, 360/97.04, 137; 361/685, 687, 725, 726; 369/75.1

[56] References Cited

U.S. PATENT DOCUMENTS

| | | | |
|---|---|---|---|
| 4,576,252 | 3/1986 | Omata | 185/39 |
| 4,669,053 | 5/1987 | Krenz | 361/685 X |
| 4,972,296 | 11/1990 | Chu | 361/725 X |
| 5,021,922 | 6/1991 | Davis et al. | 361/685 X |

FOREIGN PATENT DOCUMENTS

| | | | |
|---|---|---|---|
| 61-131280 | 6/1986 | Japan | 360/97.01 |
| 4-129084 | 4/1992 | Japan | 369/75.1 |

*Primary Examiner*—Robert S. Tupper
*Assistant Examiner*—William R. Korzuch
*Attorney, Agent, or Firm*—Jay H. Maioli

[57] ABSTRACT

A tilt device for tilting a disk drive unit by approximately 5° to 10° to facilitate the loading and unloading of disks has an opened position to expose a slot in the front of the drive unit for receiving a disk and a closed position in which the drive unit is completely enclosed within the tilt device to minimize dust and debris from collecting on the drive unit. The disk drive unit is mounted to the underside of a lid pivotably attached to a chassis of the tilt device and tilts along with the lid when the tilt device is opened. Power is available to the disk drive unit only when the tilt device is tilted open in order to prevent the drive unit from overheating.

6 Claims, 7 Drawing Sheets

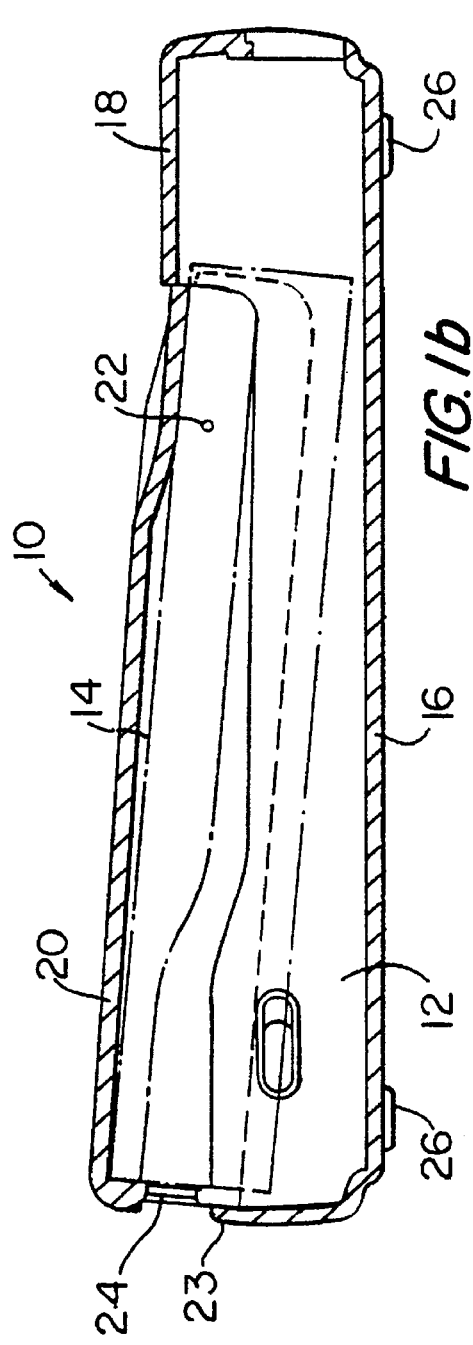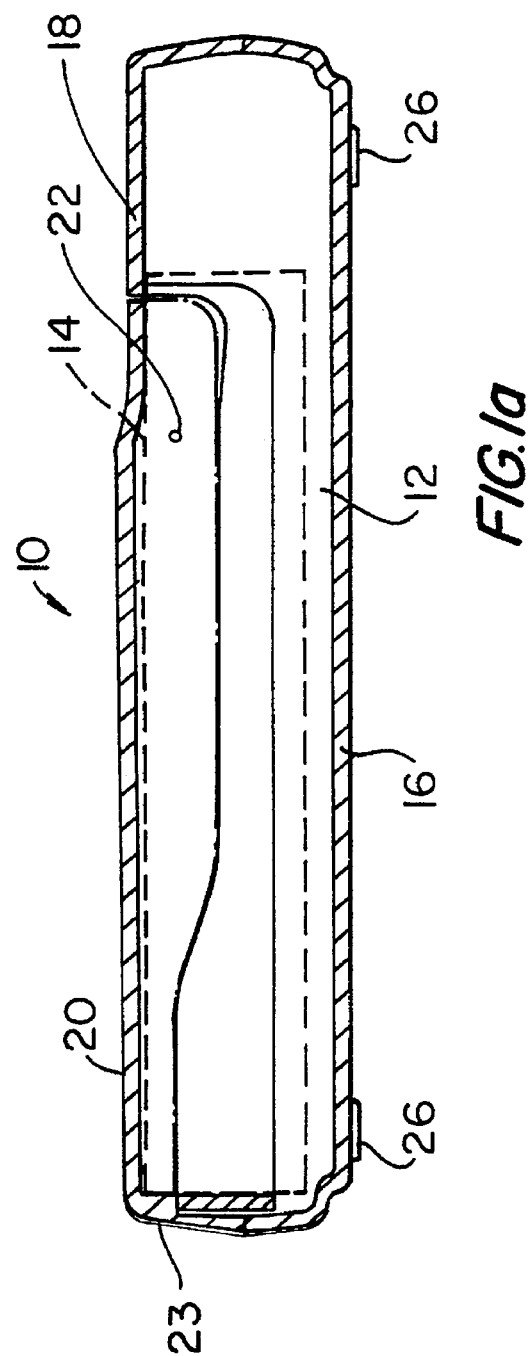

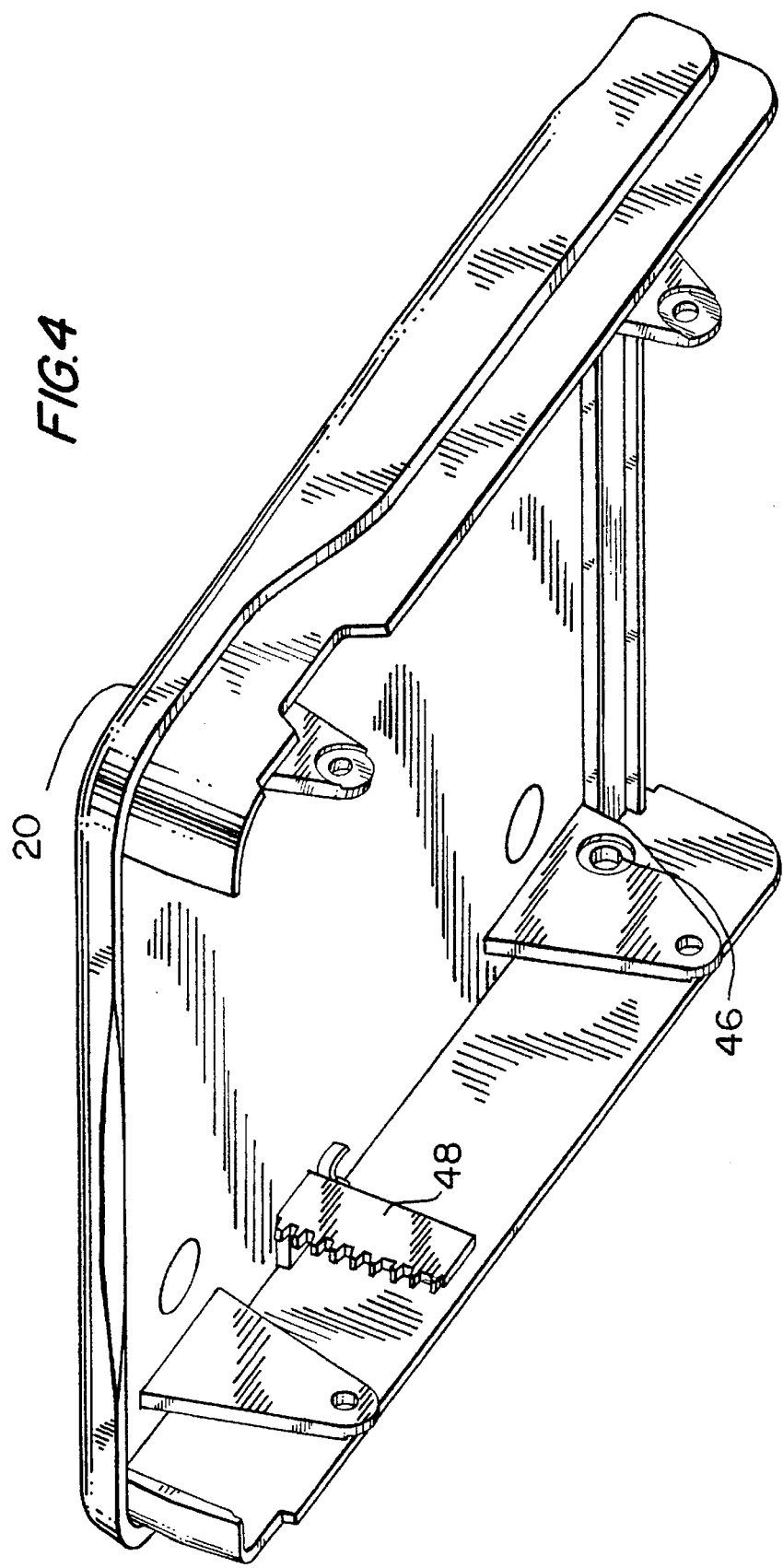

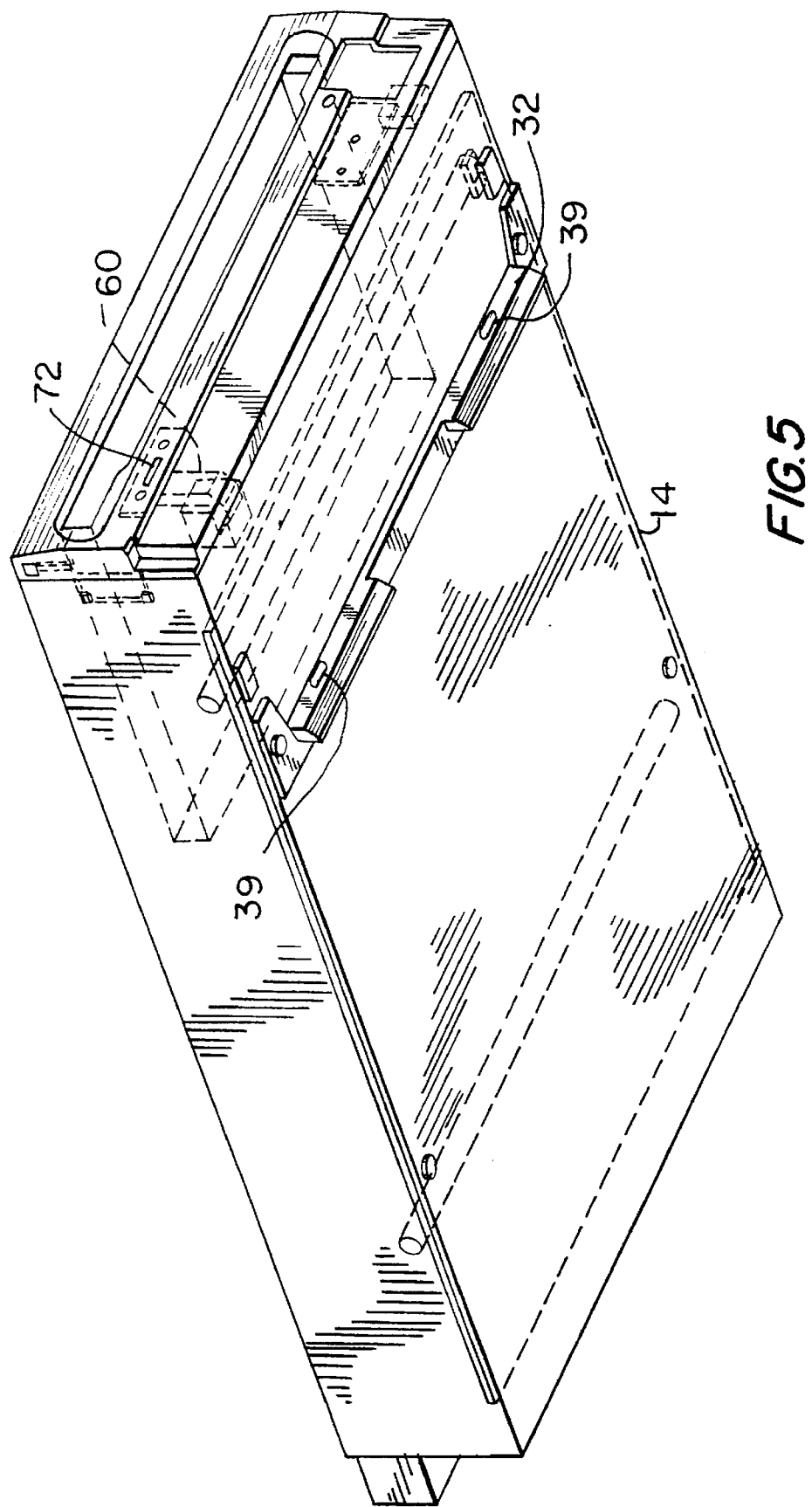

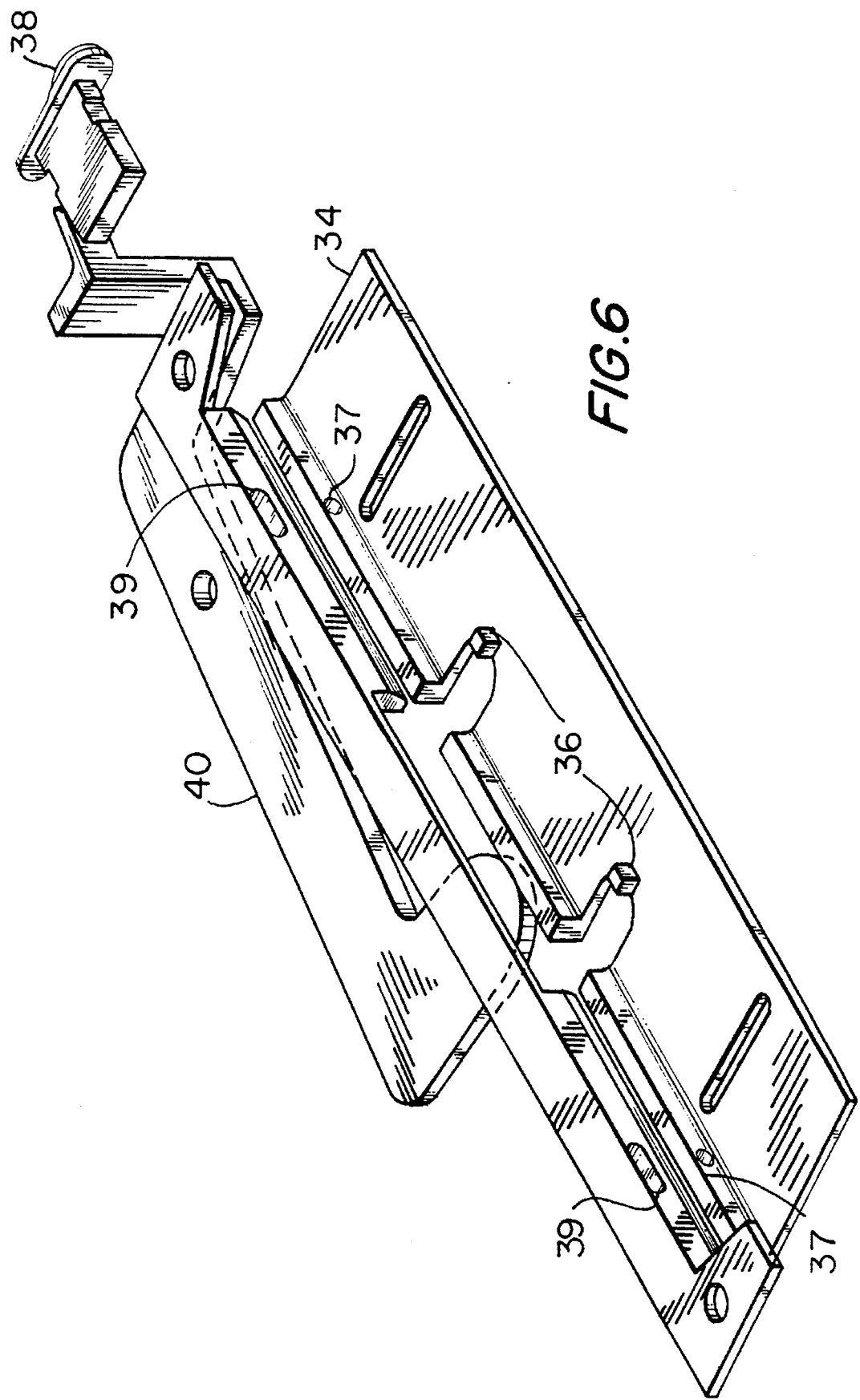

DISK DRIVE UNIT TILT DEVICE

BACKGROUND

The present invention relates generally to a disk drive unit and, more particularly, to a tilt device for an external disk drive unit of a computer.

Portable, external disk drive units are commonly used as add-on devices to computers to provide a computer user with additional options for storage and retrieval of data. For example, older generation personal computers (PCs) may lack a 3.5-inch disk drive unit that accomodates 3.5-inch diskettes, which are commonly used in newer generation PCs. Similarly, newer generation PCs may lack a 5.25-inch disk drive unit that accomodates 5.25-inch diskettes, which were commonly used in older generation PCs. External disk drive units provide a convenient way to enable a PC to be compatible with data stored on various recording media that are otherwise incompatible with the PC. In addition, only the newest PCs are equipped with CD-ROM disk drive units and therefore an external CD-ROM drive unit is a simple and convenient way to upgrade a PC to allow data stored on CD-ROM disks to be accessible without having to replace the PC.

Nevertheless, the external disk drive units that are presently available are generally inconvenient to use because the low profile of the drive units makes the loading and unloading of diskettes or CD-ROM disks difficult. A user often must bend down or hunch over to load and unload a diskette to ensure that the diskette enters and exits the disk drive unit properly. One alternative is to place the disk drive unit on top of a stack of books. This poses the danger of damage to the disk drive unit if it falls off the stack of books, for example. Another alternative is to purchase a separate stand to elevate the disk drive unit. This, of course, adds to the cost of having an external disk drive unit and it also adds to the inconvenience of having an external disk drive unit by requiring the purchase of additional items to make the disk drive unit more comfortable to use.

OBJECTS AND SUMMARY OF THE INVENTION

It is therefore an object of the present invention to provide an external disk system having a tilt device for tilting a disk drive unit to facilitate the loading and unloading of diskettes, wherein the tilt device houses a naked disk drive unit.

It is another object of the present invention to provide an external disk system wherein dust and debris are prevented from entering and collecting on the disk drive unit by enclosing the disk drive unit within the tilt device when the disk drive unit is not in use.

It is another object of the present invention to provide cooling for the disk drive unit within the tilt device.

It is another object of the present invention to prevent the disk drive unit from receiving power when the tilt device is in a closed position to prevent overheating of the disk drive unit.

According to an aspect of the present invention, a tilt device tilts the front of a disk drive unit by an acute angle, preferably 5°–10° from the horizontal plane, upwardly to expose a slot on the front of the disk drive unit into which a disk may be inserted when the tilt device is in an opened position. When the tilt device is in a closed position the disk drive unit is not tilted and the slot is covered by a lid of the tilt device.

The tilt device comprises a housing that encloses the disk drive unit therein, the housing including a chassis, a rear cap covering a rear portion of the chassis, and a lid pivotably attached to and covering a front portion of the chassis. The disk drive unit is attached to the lid such that when the lid is tilted to an opened position a slot on the disk drive unit for receiving diskettes is exposed, and when the lid is in an untitled or closed position, the slot is covered by a portion of the chassis such that the disk drive unit is completely enclosed within the housing.

BRIEF DESCRIPTION OF THE DRAWINGS

FIGS. 1a and 1b are cross-sectional side views of a tilt device in the closed position and the opened position, respectively, according to an embodiment of the present invention;

FIG. 4 is a perspective view of the lid of the tilt device of FIG. 3;

FIG. 5 is a perspective view of the bottom of the disk drive unit showing the latch, according to an embodiment of the present invention; and FIG. 6 is a perspective view of the lid release mechanism, according to an embodiment of the present invention.

DETAILED DESCRIPTION OF PREFERRED EMBODIMENTS

Figure 2:
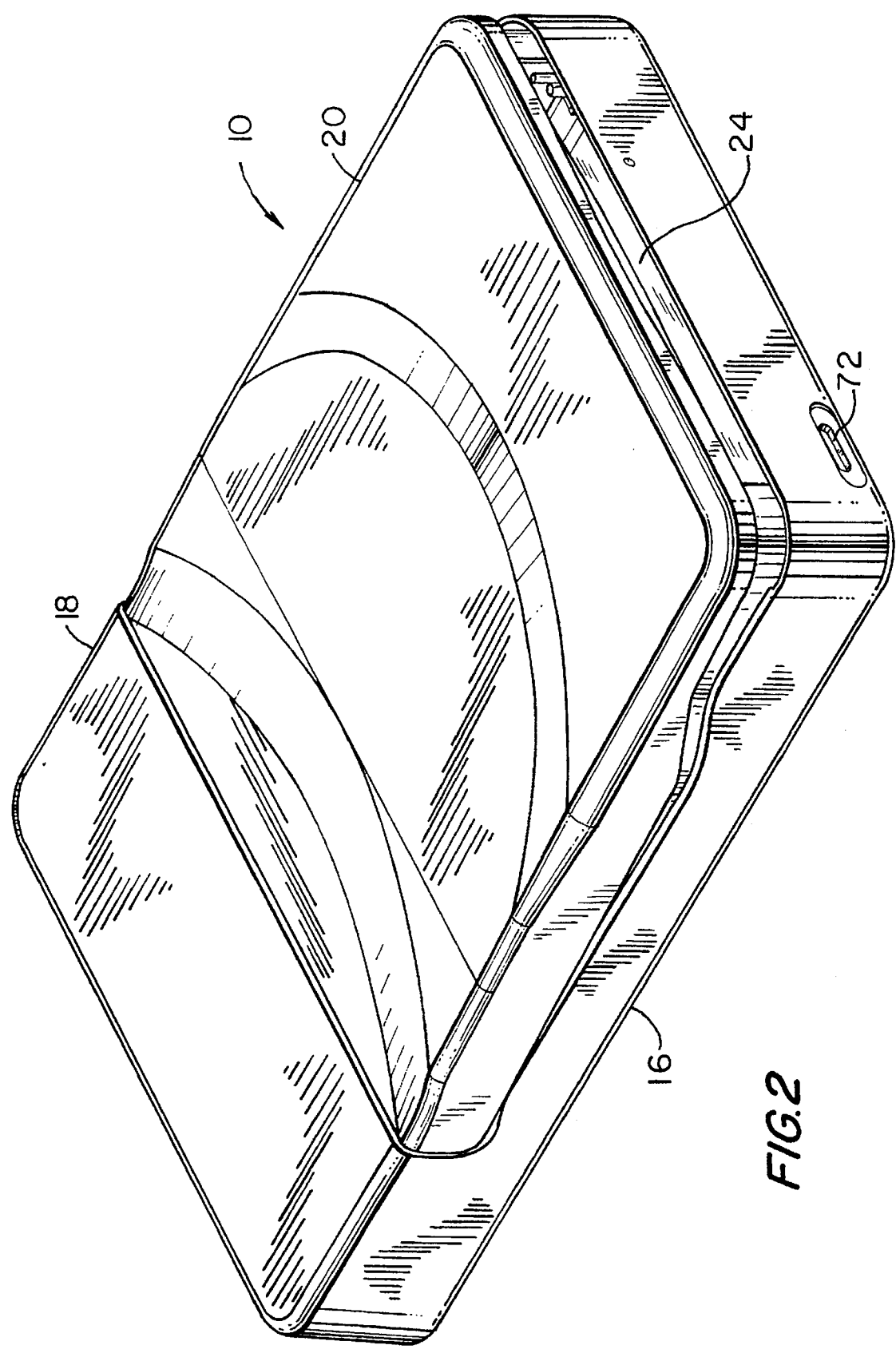
FIG. 2 is a perspective view of the tilt device of FIG. 1 in the opened position.

A preferred embodiment of the disk drive unit tilt device according to the present invention is described below with reference to the accompanying drawings, in which like reference numerals represent the same or similar elements.

FIG. 1a is a cross-sectional side view of the tilt device 10 in a closed position. A housing 12 completely encloses a naked disk drive unit 14, shown in broken lines, when the tilt device 10 is in the closed position. The housing 12 is comprised of a chassis 16, a rear cap 18 covering a rear portion of the tilt device 10 and a lid 20 pivotably attached to the chassis 16 and covering a front portion of the tilt device 10.

The disk drive unit 14 can be of the conventional kind consisting of a flat brushless DC motor driving a turntable on which the disk is placed and a lead screw and stepper motor for moving a head relative to the disk.

FIG. 1b is a cross-sectional side view of the tilt device 10 in an opened position. The lid 20 pivots about pivot pins 22 through an acute angle, preferably 5°–10° from the horizontal plane, such that the front 23 of the lid 10 tilts upwards and away from the chassis 16 to expose a slot-shaped opening 24 of the disk drive unit 14 formed between the lid 20 and the chassis 16. The disk drive unit 14 is attached to the underside of the lid 20 and tilts along with the lid 20 when the tilt device 10 is tilted to the opened position.

As shown in FIGS. 1a and 1b, the tilt device 10 also includes feet, shown typically at 26, attached to an outer surface of the chassis 16 to elevate the tilt device 10 in order that air may circulate freely about all sides of the tilt device 10.

FIG. 2 is a perspective view of the tilt device 10 in the opened position in which the slot opening 24 of the disk drive unit 14 is exposed.

The tilt mechanism and other internal components of the tilt device 10 are shown in detail in FIGS. 3a, 3b, and 4–6 and are described below.

Figure 3A:
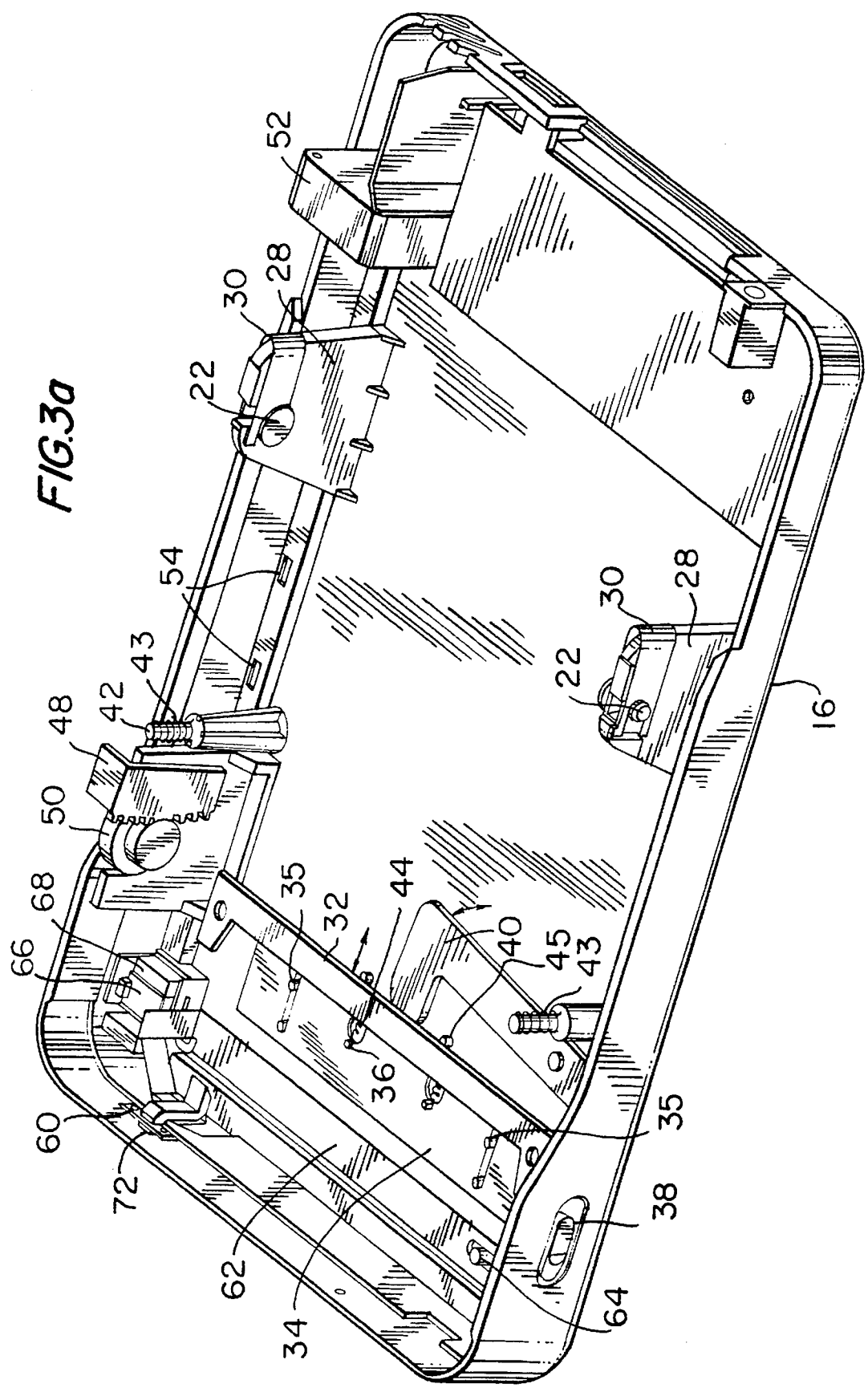
FIGS. 3a and 3b are perspective views of the tilt mechanism within the housing of the tilt device, according t an embodiment of the present invention.
Figure 3B:
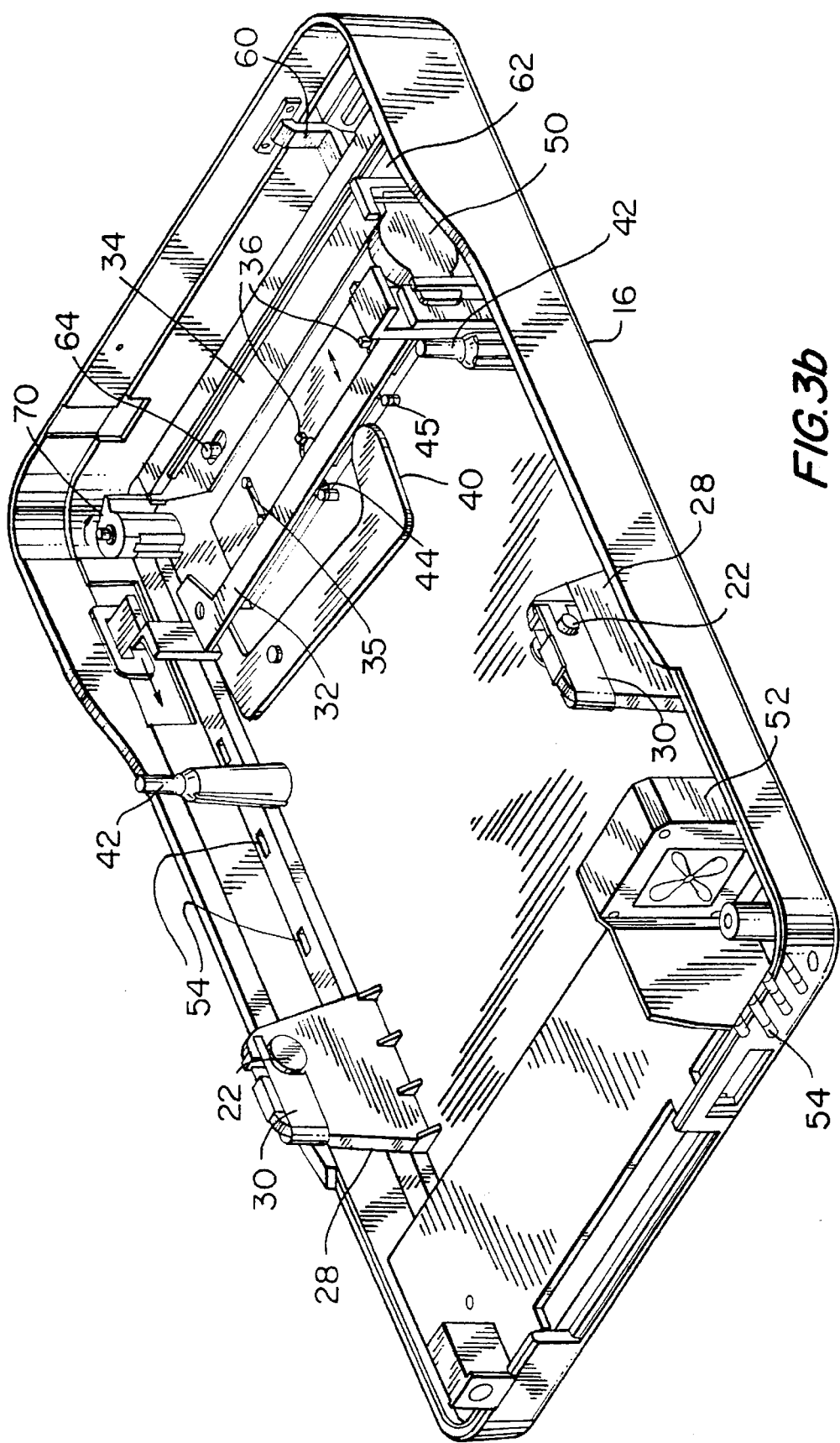

In FIGS. 3a and 3b the lid 20 is removed to show the interior of the tilt device 10, wherein the lid 20 is pivotably attached to the chassis 16 by a pair of the pivot pins 22 that extend through mounting holes 46 in the lid 20 and which are secured to respective pivot posts 28 extending upwards from an inner surface of the chassis 16 by respective guide pin retainers 30. The pins 22 are mounted in the lid 20 in the mounting holes 46 shown in FIG. 4.

The lid 20 shown in FIG. 4 is held in the closed position by a latch 32 attached to the bottom of the disk drive unit 14. FIG. 5 shows a bottom perspective view of the disk drive unit 14, showing the latch 32 attached to the bottom of the disk drive unit 14. Alternatively, the latch 32 could be attached to an inner surface of the lid 20.

A spring-loaded latch retainer 34 is movably connected to the chassis 16 for sliding movement by a plurality of slide pins 35, as shown in FIGS. 3a and 3b. The latch retainer 34 is biased rearwardly by a plurality of retaining springs 44 attached respectively to spring catches 36 attached to the latch retainer 34 and to spring catches 45 attached to the chassis 16. The retaining springs 44 bias the spring catches 36, 45 against the latch 32 such that retainer pegs 37 disposed on the latch retainer 34 are held within peg-receiving slots 39 in the latch 32 to hold both the lid 20 and the disk drive unit 14 in the closed position.

When a lid release slide button 38 is manipulated by the user to open the lid 20, the slide button 38 acts to pivot a latch release lever 40 to disengage the retainer pegs 37 on the latch retainer 34 from the peg-receiving slots 39 in the the latch 32 by pushing against the latch retainer 34 to stretch the retaining springs 44, as shown in FIG. 6. Two spring guides 42 and corresponding springs 43 provide a spring force to lift and tilt both the lid 20 and the disk drive unit 14 mounted onto the lid 20. A lid gear 48 is in the form of a rack gear and extends downwardly from the inner surface of the lid 20. The lid gear 48 engages with a damper gear 50 mounted in the chassis 16 to control the speed at which the lid 20 tilts open. A limiter (not shown) on the damper gear 50 restricts the extent of opening of the lid to preferably 5°–10° from the horizontal plane.

A fan 52 attached to the housing 12 and located in the rear portion of the tilt device 10 underneath the rear cap 18 provides air circulation to cool the disk drive unit 14. Breather holes 54 in the chassis 16 facilitate air circulation between inside and outside of the tilt device 10.

The chassis 16 includes an opening therethrough exposing a power button 68 secured in the chassis 16 by a power button retainer 66. When the power button 68 is moved to an "on" position, electrical power is provided to the disk drive unit 14. The power button 68 also pushes against a limiter slide 62 movably attached to the chassis 16 by guide pins 64 when the power button 68 is moved to the "on" position. The limiter slide 62, in turn, engages a limiter cam 70 to rotate the limiter cam 70 to a position that prevents the lid 20 from closing while power is being supplied to the disk drive unit 14 to prevent overheating of the disk drive unit 14. The limiter cam 70 and the limiter slide 62 also act to prevent the power button 68 from being moved to the "on" position when the lid 20 is closed.

A light pipe 60, shown in FIG. 5, may be used to reflect light from a light-emitting diode (not shown) on a main board of the disk drive unit 14 to a light pipe opening 72 on the chassis to indicate when the disk drive unit 14 is accessing a disk.

The embodiment described above is an illustrative example of the present invention and it should not be construed that the present invention is limited to that particular embodiment. Various changes and modifications may be effected by one skilled in the art without departing from the spirit or scope of the invention as defined in the appended claims.

What is claimed is:

1. A tilt device for tilting a disk drive unit, the tilting device comprising:

a hollow housing for containing the disk drive unit therein, the housing having an open top portion;

a lid for covering the open top portion of the housing, wherein the disk drive unit is attached to an underside surface of the lid and has a disk-receiving slot formed therein;

pivoting means for pivotally connecting the lid to the housing;

tilting means for pivoting the lid relative to the housing to an opened position such that the disk-receiving slot of the disk drive unit is exposed when the lid is pivoted to the opened position;

a rack gear extending downwardly from the underside surface of the lid;

a damper gear extending from an inner surface of the housing, the damper gear being engaged with the rack gear to control a speed at which the lid is opened;

limiting means for restricting the opened position of the lid to be approximately 5° to 10° from a horizontal plane;

a latch secured to the disk drive unit;

a latch retainer movably connected to the inner surface of the housing;

a first set of spring catches attached to the latch retainer;

a second set of spring catches attached to the inner surface of the housing and corresponding to the first set of spring catches;

a set of retaining springs for movably connecting the first set of spring catches on the latch retainer to the corresponding second set of spring catches on the housing; and a plurality of retainer pegs disposed on the latch retainer, wherein the latch further contains respective peg-receiving slots for receiving the plurality of retainer pegs on the latch retainer, and the retaining springs bias the spring catches against the latch to hold the plurality of retainer pegs within respective peg-receiving slots on the latch to maintain the lid in the closed position.

2. The tilt device according to claim 1 wherein the tilt mechanism comprises:

a lid release slide button for opening the lid;

spring guides and corresponding tilting springs for pushing the lid to the opened position; and a latch release lever movably attached to the housing such that when the lid release slide button is manipulated to open the lid the latch release lever moves the latch retainer against a biasing force of the retaining springs, whereby the spring catches release the latch and the retainer pegs are displaced from within the peg-receiving slots to allow the spring guides and corresponding tilting springs to push the lid to the opened position.

3. The tilt device according to claim 2, wherein the pivoting means comprises:

pivot posts extending upwardly from the inner surface of the housing; and pivot pins extending through mounting holes formed in the lid and being secured to the pivot posts of the housing by guide pin retainers.

4. The tilt device according to claim 3, further comprising:

a power button for providing power to the disk drive unit, the power button being secured to the housing by a power button retainer;

a limiter cam; and a limiter slide for engaging the limiter cam, wherein the limiter slide is connected to the power button such that when the power button is moved to an ON position to provide power to the disk drive unit the power button moves the limiter slide and the limiter slide rotates the limiter cam to a position that contacts a lower edge of the lid and prevents the lid from closing in order to prevent the disk drive unit from overheating, and when the lid is in the closed position the lower edge of the lid abuts the limiter cam and prevents rotation thereof, so that the limiter slide is prevented from movement and the power button can not be moved to the ON position.

5. The tilt device according to claim 4, further comprising:

a light pipe to reflect light from a light-emitting diode on the disk drive unit, the light-emitting diode for indicating when the disk drive unit is accessing a disk, wherein the housing further contains a light-pipe opening to which light from the light-emitting diode is reflected by the light pipe.

6. A tilt device for tilting a disk drive unit, the tilt device comprising:

a chassis having pivot posts extending upwardly from an inner surface thereof;

a rear cap for covering a rear portion of the chassis;

a lid pivotably attached to the chassis by pivot pins which extend through mounting holes in the lid and which are secured to the pivot posts of the chassis by guide pin retainers and having the disk drive unit attached to an underside thereof, wherein the lid, the rear cap, and the chassis form a housing that contains the disk drive unit therein, the lid has a closed position in which the lid covers the front portion of the chassis to prevent access to the disk drive unit and to minimize dust and debris from entering and collecting on the disk drive unit, and the lid has an opened position in which the lid is tilted upwards and away from the chassis to expose a disk-receiving slot opening of the disk drive unit therebetween;

a latch secured to the disk drive unit;

a latch retainer movably connected to the chassis;

a first set of spring catches attached to the latch retainer;

a second set of spring catches attached to the inner surface of the chassis and corresponding to the first set of spring latches;

a set of retaining springs for movably connecting the first set of spring catches on the latch retainer to the corresponding second set of spring catches on the chassis;

a plurality of retainer pegs disposed on the latch retainer, wherein the latch further contains respective peg-receiving slots for receiving the plurality of retainer pegs such that the retaining springs bias the spring catches against the latch to hold the plurality of retainer pegs within respective peg-receiving slots on the latch to maintain the lid in the closed position;

a lid release slide button for opening the lid;

spring guides and corresponding tilting springs for pushing the lid to the open position;

a latch release lever movably attached to the chassis such that when the lid release slide button is manipulated to open the lid the latch release lever moves the latch retainer against a biasing force of the retaining springs, whereby the spring catches release the latch and the retainer pegs are displaced from within the peg-receiving slots to allow the spring guides and corresponding tilting springs to push the lid to the opened position;

a rack gear extending downwardly from the underside surface of the lid;

a damper gear extending from the inner surface of the chassis, the damper gear being engaged with the rack gear to control a speed at which the lid is pushed open; and limiting means for restricting the opened position of the lid to be approximately 5° to 10° from a horizontal plane.

* * * * *